United States Patent Office 3,284,709
Patented Nov. 8, 1966

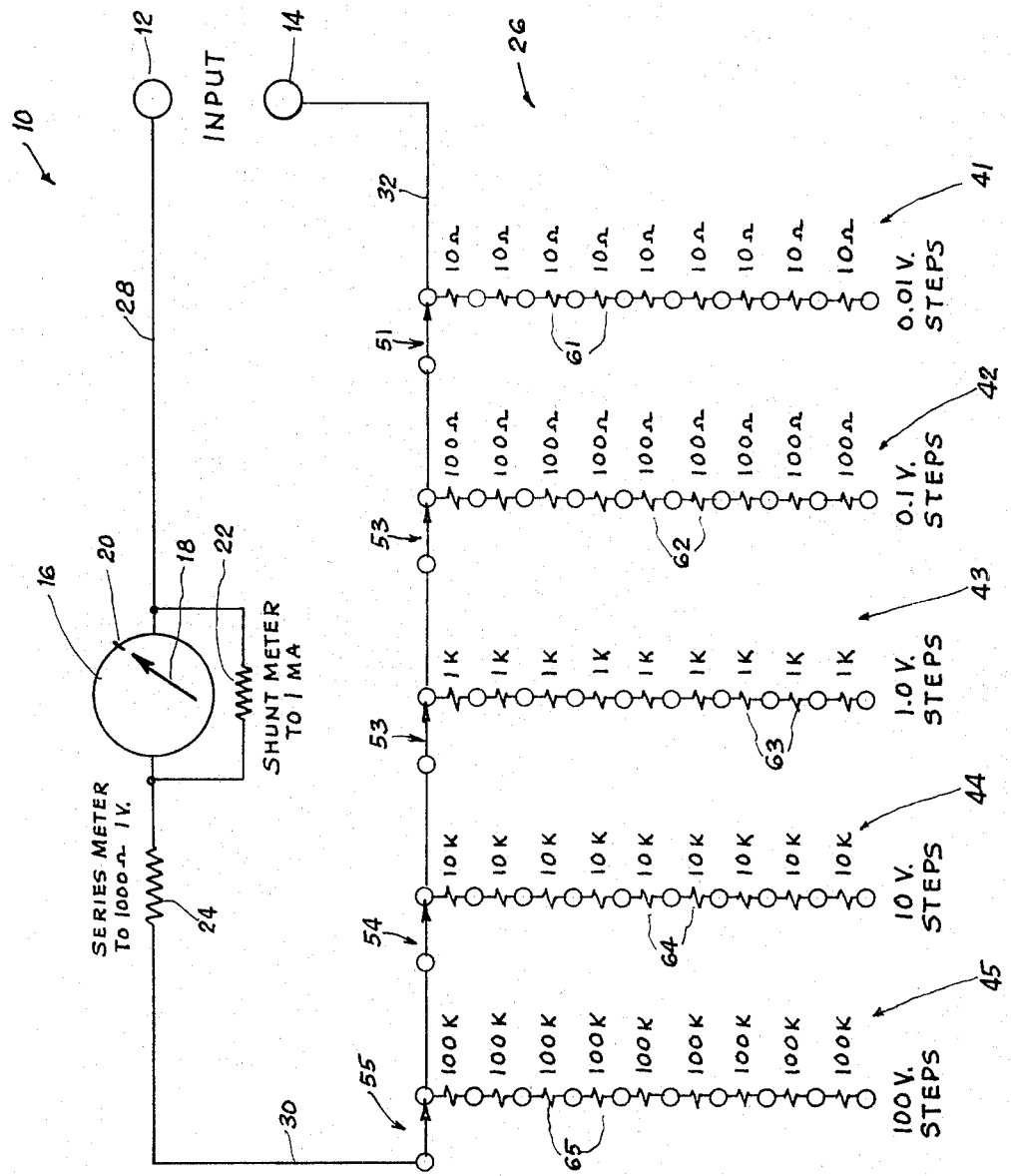

3,284,709
PRECISION VOLTMETER USING SELECTABLE SERIES CONNECTED, DIGITALLY RELATED RESISTORS WHICH ARE CALIBRATED TO READ THE VALUE OF INPUT SIGNAL
Peter A. De Paolo, Elmwood Park, Ill., assignor to American Gage & Machine Company, Chicago, Ill., a corporation of Illinois
Filed Jan. 17, 1962, Ser. No. 166,959
5 Claims. (Cl. 324—98)

This invention relates to instruments for measuring electrical voltage.

One object of the present invention is to provide an instrument for measuring electrical voltage with a high degree of precision.

A further object is to provide a new and improved instrument of the foregoing character, having a meter adapted to be brought to a full-scale reading, or some other predetermined reading, for each unknown value of voltage to be measured, by adjusting a precision decade resistance array, connected in series with the meter, the resistance of the array being a measure of the unknown voltage.

Another object is to provide a new and improved meter of the foregoing character which does not depend primarily for its accuracy upon the scale calibration of a meter movement, but rather depends upon the calibration of an adjustable decade resistance array, which can readily be calibrated to a high degree of precision.

Further objects and advantages of the present invention will appear from the following description, taken with the accompanying drawing, in which the single figure is a circuit diagram of an exemplary precision voltmeter to be described as an illustrative embodiment of the present invention.

As already indicated, the drawing illustrates an instrument 10 for measuring unknown electrical voltages. The instrument 10 is adaptable for measuring either direct or alternating current voltages. The unknown voltage to be measured is applied across a pair of input terminals 12 and 14.

The instrument 10 utilizes a meter 16 of any known or desired type, for indicating the flow of electrical current. The illustrated meter 16 has a movable needle 18 which is displaced or swung across the face of the meter when electrical current flows through the meter. Preferably, the meter 16 takes the form of a sensitive milliammeter or microammeter. The meter 16 may be adapted to be operated by either direct or alternating current. However, it may be considered, by way of example, that the meter 16 is adapted to be operated by direct current.

Instead of having a graduated scale, the meter 16 merely has a single scale marking 20, representing a full-scale reading or any other predetermined reading. For each value of unknown voltage, the meter 16 is brought to the full-scale reading. In this way, the meter 16 is always utilized under full-scale conditions, at which the meter affords maximum sensitivity and accuracy.

The meter 16 may be adjusted internally to give its full-scale reading for a convenient standard current. However, it is normally preferable to provide external means for adjusting the meter for a full-scale reading at a standard current. Thus, in the illustrated instrument 10, the meter 16 is provided with a shunt resistor 22 which may be adjusted so that the meter 16 comes to full scale with a convenient standard current. Any standard current may be employed, but, by way of example, it will be considered that the standard current is 1 milliampere.

The meter 16 might be adjusted internally so as to have a convenient standard resistance, but it is normally preferable to provide external means for adjusting the meter to the desired standard resistance. In the illustrated array, a calibrating resistor 24 is connected in series with the parallel combination of the meter 16 and the shunt resistor 22. Any standard resistance may be employed, but, by way of example, it will be considered that the resistor 24 is adjusted to a value such that the series combination of the resistor 24 and the meter 16, with its shunt 22, presents a resistance of 1,000 ohms. With this array, an input voltage of 1 volt, applied across the 1,000 ohms of resistance, will cause a current of 1 milliampere to flow, so that the meter 16 will be brought to full scale. Thus, with no added series resistance, the meter 16 will come to full scale with an applied voltage of 1 volt.

To provide for the measurement of other values of voltage, the instrument 10 is equipped with an adjustable precision decade resistance box or array 26. Leads 28, 30 and 32 are employed to connect the resistance array 26 and the meter 16, with its shunt and series resistors 22 and 24, in series across the input terminals 12 and 14.

The illustrated resistance array 26 comprises a plurality of sets or tiers of resistances. In this case, there are five such sets 41, 42, 43, 44 and 45. Each of the sets 41–45 comprises a plurality of individual resistors, preferably 9 in number. The sets 41–45 are provided with respective switching means 51–55, arrayed so that each resistor may be connected successively into the series circuit of the instrument 10. The switching means may comprise actual switches, or any other switching arrangement, such as plug boards or the like.

The values of the resistors in adjacent sets are related by a factor of 10. In this way, the total resistance of the array 26 may be varied in steps corresponding to units, 10's, 100's, etc. The illustrated array 26 provides for adjustment in steps of 100ths, tenths, units, 10's and 100's of volts. Thus, the resistance array 26 extends the range of the instrument 10 from one volt to 1000.99 volts in steps of 1/100 of one volt.

It will be recalled that the series calibrating resistor 24 is adjusted to a value such that the series combination of the resistor 24 and the meter 16, with its shunt 22, presents a standard resistance of 1,000 ohms. The shunt 22 is adjusted to bring the meter 16 to full scale with a current of 1 milliampere. Thus, to provide for steps of one volt, the resistance tier 43 utilizes 9 individual resistors 63, each having a value of 1,000 ohms. As each resistor 63 is connected into the series, one additional volt will be required to bring the meter 16 to full scale. The adjacent resistance tier 44 employs 9 resistors 64, each having a resistance of 10,000 ohms. Similarly, the next tier 45 employs resistors 65, each having a resistance of 100,000 ohms.

To provide for variation of the instrument adjustment in steps of 1/10 of 1 volt, the tier 42 utilizes resistors 62 having individual values of 100 ohms. The tier 41 employs resistors 61, each having a value of 10 ohms, so as to provide for adjusting the instrument in steps of 1/100 of 1 volt.

The instrument 10 is used by applying the unknown voltage to be measured across the input terminals 12 and 14. Initially, the decade resistance array 26 may be adjusted to its maximum value, or at least to a high value, so as to avoid any possibility of damaging the meter 16 by the flow of excessive current therethrough. The decade resistance array 26 is adjusted, after the application of the unknown voltage, so as to bring the meter 16 to the predetermined scale marking 20. The unknown voltage may then be found by multiplying the standard or calibrating voltage times the ratio of the total series resistance divided by the standard resistance. The total series resistance is found by adding the initial or standard resistance of the meter to the adjusted resistance of the decade array 26.

Thus, by way of example, it may be supposed that the meter 16 is brought to full scale when the decade array 26 is adjusted to a value of 347,620 ohms. The total series resistance of the instrument 10 is found by adding the meter resistance of 1,000 ohms, thus giving a value of 348,620. This value is divided by the standard or initial resistance of 1,000 ohms and is multiplied by the standard or initial voltage of 1 volt, so that the unknown voltage is found to be 348.62 volts. For convenience, the switches 51–55 may be calibrated directly in voltage, in such a way that the input voltage may be found by simply adding the settings of the switches. The initial setting of the units switch 53 should be calibrated as 1 volt to allow for the initial or standard resistance of the meter 16.

It will be realized that the meter 16 may be adjusted to full scale with a high degree of precision, because the meter operates with maximum sensitivity and accuracy at full scale. By the application of well known techniques, the values of the resistors of the decade array 26 may be calibrated with an extremity high degree of precision. Thus, the instrument will be capable of making highly precise voltage measurements. The instrument provides substantially the same degree of precision throughout its entire range, rather than being less precise in the lower part of its range, as is the case with most instruments. The degree of precision afforded by the present instrument is achieved at unusually low cost.

Various modifications, alternative constructions and equivalents may be employed without departing from the true spirit and scope of the invention as exemplified by the foregoing description and defined in the following claims.

I claim:
1. A precision voltmeter for measuring unknown voltages,
    comprising the combination of meter means for measuring electrical current,
    said meter means affording a substantially full scale reading at a particular input current determined by the sensitivity of said meter means,
    said meter means having a particular resistance thereacross of a value such that the first digit of the product of said particular current and said particular resistance is unity while any and all following digits are substantially zero,
    a variable decade resistance array,
    a pair of terminals for receiving the unknown voltage to be measured,
    and means connecting said decade resistance array and said meter means in a series circuit between said terminals,
    the unknown voltage to be measured being the sole source of voltage in said circuit,
    said decade resistance array having a plurality of tiers of resistances connected in series,
    each of said tiers having nine resistances and switching means for connecting said resistances successively into said series circuit,
    all of the resistances of each respective tier being of the same value,
    the values of the resistances of adjacent tiers being related by a factor of ten,
    said resistances of said successive tiers being related to said particular resistance by sequential powers of ten,
    said decade resistance array being calibrated in terms of decimal multiples and submultiples of said particular resistance,
    said decade resistance array being adjustable to bring said meter means to said full scale reading for any unknown voltage being measured,
    the unknown voltage being indicated directly by the setting of said decade resistance array plus said particular resistance.

2. A precision voltmeter according to claim 1,
    comprising means for adjusting said meter means to provide said full scale reading thereon at said particular input current.

3. A precision voltmeter according to claim 1,
    comprising means for adjusting said meter means to present said particular resistance thereacross.

4. A precision voltmeter according to claim 1,
    in which said meter means comprises an electrical meter affording said full scale reading at said particular current,
    and an adjustable calibrating resistor connecting in series with said meter for adjusting said meter means to present said particular resistance thereacross.

5. A precision voltmeter according to claim 1,
    in which said meter means comprise an electrical meter for indicating the electrical current,
    an adjustable shunt resistor connected in a parallel combination with said meter for adjusting said meter to afford said full scale reading at said particular current to said parallel combination,
    and an adjustable calibrating resistor connected in series with said parallel combination for adjusting said meter means to said particular resistor thereacross.

References Cited by the Examiner

UNITED STATES PATENTS

| | | | |
|---|---|---|---|
| 383,649 | 5/1888 | Lange | 324—98 |
| 383,672 | 5/1888 | Shallenberger | 324—98 |
| 401,617 | 4/1889 | White | 324—98 |
| 426,499 | 4/1890 | Hicks | 324—115 |
| 1,901,343 | 3/1933 | Eastham | 324—115 |
| 2,508,424 | 5/1950 | Rouy | 324—98 |
| 2,644,134 | 6/1953 | Schnoll | 324—122 X |

OTHER REFERENCES

"C. D. Capacitor," Publication by Cornell-Dubilier Electric Corp., vol. 21, No. 9, September 1956, pages 3, 4 and 5 relied on.

WALTER L. CARLSON, *Primary Examiner.*

R. V. ROLINEC, *Assistant Examiner.*